(12) United States Patent
Grass et al.

(10) Patent No.: US 7,638,568 B2
(45) Date of Patent: Dec. 29, 2009

(54) USE OF ISONONYL BENZOATE AS A FILM-FORMING AGENT

(75) Inventors: Michael Grass, Haltern am See (DE); Jürgen Koch, Haltern am See (DE)

(73) Assignee: OXENO Olefinchemie GmbH, Marl (DE)

( * ) Notice: Subject to any disclaimer, the term of this patent is extended or adjusted under 35 U.S.C. 154(b) by 412 days.

(21) Appl. No.: 10/570,199

(22) PCT Filed: Jul. 16, 2004

(86) PCT No.: PCT/EP2004/051523

§ 371 (c)(1), (2), (4) Date: Mar. 2, 2006

(87) PCT Pub. No.: WO2005/026249

PCT Pub. Date: Mar. 24, 2005

(65) Prior Publication Data

US 2007/0010599 A1    Jan. 11, 2007

(30) Foreign Application Priority Data

Sep. 9, 2003    (DE) ................................ 103 41 428

(51) Int. Cl.
- *C08K 5/101*  (2006.01)
- *C08K 5/04*   (2006.01)
- *C08F 2/16*   (2006.01)
- *C08F 2/22*   (2006.01)

(52) U.S. Cl. ........................ 524/292; 524/284; 524/804; 524/832

(58) Field of Classification Search ................. 524/292, 524/284, 287, 800, 804, 832, 270, 296
See application file for complete search history.

(56) References Cited

U.S. PATENT DOCUMENTS

| | | | | |
|---|---|---|---|---|
| 4,853,451 | A * | 8/1989 | Clark | ............ 526/331 |
| 5,236,987 | A * | 8/1993 | Arendt | ......... 524/287 |
| 2004/0015007 | A1* | 1/2004 | Grass et al. | ............ 560/103 |
| 2004/0138358 | A1 | 7/2004 | Koch et al. | |
| 2005/0049341 | A1 | 3/2005 | Grass et al. | |

FOREIGN PATENT DOCUMENTS

| | | |
|---|---|---|
| EP | 1 354 867 | 10/2003 |
| WO | 89/00173 | 1/1989 |
| WO | 01/29140 | 4/2001 |

OTHER PUBLICATIONS

U.S. Appl. No. 10/575,100, filed Apr. 10, 2006, Grass, et al.

\* cited by examiner

*Primary Examiner*—Vasu Jagannathan
*Assistant Examiner*—Karuna P Reddy
(74) *Attorney, Agent, or Firm*—Oblon, Spivak, McClelland, Maier & Neustadt, L.L.P.

(57) ABSTRACT

The present invention relates to the use of isononyl esters of benzoic acid as film-forming agents in compositions such as emulsion paints, mortars, plasters, adhesives, and varnishes, and also to compositions which comprise film-forming polymers and the isononyl ester of benzoic acid.

12 Claims, No Drawings

USE OF ISONONYL BENZOATE AS A FILM-FORMING AGENT

The present invention relates to the use of isononyl esters of benzoic acid as film-forming agents in compositions such as emulsion paints, mortars, plasters, adhesives, and varnishes, and also to compositions comprising film-forming polymers and isononyl esters of benzoic acid.

Aqueous dispersions of film-forming homopolymers or copolymers, including terpolymers, can be used, for example, as binders for coating materials for the interior and exterior sectors. One important criterion for the processing of a paint is the minimum filming temperature (MFT), which must be below the ambient temperature, in the case of exterior paints usually about 5° C., in order to ensure effective spreadability. The minimum filming temperature can be adjusted in principle in two different ways.

The first option for adjusting the MFT lies in the copolymerization, including terpolymerization, of monomers which on the basis of their structure are able to contribute to lowering the glass transition temperature, $T_g$, and thus the MFT (internal plasticization). Acrylates, for example, may serve as suitable monomers.

Generally speaking, however, the addition of film-forming agents is the more cost-effective method of lowering the MFT. Similarly to the external plasticization of PVC, here the MFT is reduced significantly as a function of the efficiency and quantity of the film-forming agent.

In Europe, film-forming agents used predominantly are 2,2,4-trimethyl-1,3-pentanediol monoisobutyrate (e.g., Texanol, Eastman) and glycol ethers of the dipropylene glycol n-butyl ether (DPnB) or tripropylene glycol n-butyl ether (TPnB) type, or else dimethyl phthalate (DMP). Texanol was for a long time the standard among the film-forming agents. However, the comparatively high vapor pressure of this product is no longer in tune with the ever more stringent regulations governing volatile organic constituents (VOCs).

In Germany in particular the "Blue Angel" quality seal (RAL-UZ 102) is playing an increasingly important role as regards interior paints for the consumer market. In combination with a "Directive on the declaration of ingredients in architectural paints and coatings and related products" issued by the Verband der Lackindustrie e.V. [VdL; Paint Industry Association] (VdL-RL 01, version 2, April 2000), the use of the majority of the abovementioned products is prohibitive to the awarding of this environmental mark. DPnB and Texanol, for instance, fail simply on account of the low boiling point (<250° C.). Glycol ethers and phthalates are classified by the April 2000 VdL Directive as "plasticizers". Finished products containing these "plasticizers" in amounts of more than 1 g/l are excluded from the awarding of a Blue Angel mark.

There is therefore a need for the development of further, and in particular more cost-effective, products which allow the MFT to be lowered significantly even at low concentrations and which at the same time have such a low vapor pressure that the provisions specified can be complied with.

The use of benzoic esters of alcohols having a chain length of 8 to 13 carbon atoms as plasticizers for PVC is described in DE 19 62 500.

U.S. Pat. No. 5,236,987 includes a reference to the use of other benzoic esters having chain lengths of $C_8$ to $C_{12}$. The prior art has disclosed the use of monoalkyl benzoates of this kind, such as 2-ethylhexyl benzoate (WO 01/29140) or isodecyl benzoate (U.S. Pat. No. 5,236,987), for example, as film-forming agents. These products score over the standard Texanol product by virtue of lower volatility and significantly reduced odor.

The as-yet unpublished application DE 102 17 186 describes the use of isomeric nonyl benzoates having a 3,5,5-trimethylhexyl benzoate fraction of less than 10% as flexibilizers for paints, inks, and adhesives, or components of adhesives, and as plasticizers for PVC.

It was an object of the present invention to provide film-forming agents which have a low volatility and which are easy and hence inexpensive to prepare, and compositions comprising said film-forming agents. The film-forming agents ought in particular to be suitable for use in paints which then comply with the requirements of the April 2000 VdL Directive.

Surprisingly it has been found that esters of benzoic acid with isomeric $C_9$ alcohols (isononanol) display properties improved over those of the quasi-homologous 2-ethylhexyl benzoate and isodecyl benzoate when used as film-forming agents in aqueous binder dispersions. As compared with 2-ethylhexyl benzoate, isononyl benzoate, despite a higher boiling point and the lower volatility demonstrable by thermogravimetry, exhibits at least as good an evaporation from coatings and an at least equal efficiency (lowering of the minimum filming temperature). In comparison to isodecyl benzoate, isononyl benzoate provides a more effective lowering of the MFT and in particular a much better evaporation behavior (more rapid drying is possible). This circumstance was particularly surprising, since it was assumed that the increasing chain length of the alcohol would be accompanied not only by a rise in boiling temperature and corresponding fall in volatility but also by a deterioration in the evaporation behavior from coatings, on the basis of the higher boiling point. Surprisingly, however, it was found that, in respect of these variables, in the homologous series $C_8$ -$C_9$-$C_{10}$ benzoate an optimum appears to lie with isononyl benzoate.

The present invention accordingly provides compositions which comprise a dispersion, in particular an aqueous dispersion, of at least one film-forming polymer selected from homopolymers and copolymers, including terpolymers, and at least one film-forming agent, said compositions comprising, as at least one film-forming agent, isononyl benzoate, which is present in a concentration of from 0.1 to 30% by mass, based on the dry weight of the polymer.

Likewise provided by the present invention is the use of one or more of the compositions of the invention as a paint or adhesive or for producing paints or adhesives.

An effective film-forming agent is required to meet essentially four main criteria. First of all it must have a high compatibility with the base polymer, often referred to as binder; that is, there must not be any separation. It must also show a high efficiency in terms of the lowering of the minimum filming temperature, and the volatility ought to be low. In this context it should be borne in mind that too low a volatility could lead to the film-forming agent adhering to the surface for an unduly long time, with the consequence that it would bind dirt. Accordingly, a good compromise ought to be found in terms of the volatility. Since informed circles are already considering raising the minimum boiling point of the film-forming agents to 280° C. or 300° C. as a future criterion for the awarding of a Blue Angel mark, products having a boiling point of just above 300° C. would appear to be particularly suitable.

Finally, the water-solubility ought to be very low, so that during the drying process the film-forming agent is most effectively able to develop its activity on the surface of the particles.

Isomeric nonyl benzoates meet these criteria at least as well as, if not better than, the existing systems or systems used in the market. As compared with the ester alcohols (Texanol) or the glycol monobutyl ethers (e.g., Dowanol, Dow Chemical)

they have the advantage of the lower water-solubility in combination with comparable efficiency. The boiling range is situated above 310° C.—for example, as determined in the example, in the range from 316 to 326° C. In contrast, 2-ethylhexyl benzoate, for example, has a boiling temperature of approximately 297° C. (manufacturer's information, Velsicol). The present invention accordingly further provides a film-forming agent which is suitable, for example, for use in a composition of the invention and is an isononyl benzoate. The film-forming agent is preferably an isononyl benzoate for which the nonyl alcohols obtained by hydrolyzing the isomeric isononyl benzoates contain less than 10 mol% of 3,5,5-trimethylhexanol.

The film-forming agent of the invention is also suitable, furthermore, as a cleaning agent or as a cleaning agent ingredient, particularly for cleaning agents for cleaning paint lines.

The composition of the invention comprising the film-forming agent of the invention has the advantage that, as compared in particular with compositions comprising 2-ethylhexyl benzoate, and despite the significantly higher boiling point, it exhibits equally good evaporation behavior from coatings and/or films, which is advantageous for the rapid curing of a paint. In contrast to compositions comprising isodecyl benzoate, compositions which comprise the isononyl benzoate of the invention (isomeric nonyl esters, isononyl benzoate, INB) lower the MFT more effectively at the same concentration. The compositions of the invention are very easy and inexpensive to prepare, since the alcohol component of the INB, isononanol, is produced industrially, on the basis of naphtha, in quantities of several hundred thousand metric tons per annum and there is no need to use a benzoic ester based on much more expensive, pure isomers of nonanol, such as n-nonanol, for example.

The use of isononyl benzoate as a film-forming agent in compositions, in accordance with the invention, and these compositions and their use are described by way of example below, without any intention that the invention should be restricted to these embodiments.

The composition of the invention, which comprises an aqueous dispersion of at least one film-forming polymer selected from homopolymers and copolymers, including terpolymers, and at least one film-forming agent, has the characteristic feature of comprising, as at least one film-forming agent, isononyl benzoate, which is present in a concentration of from 0.1 to 30% by mass, preferably from 0.3 to 20% by mass, more preferably from 0.5 to 10% by mass, based on the dry weight of the polymer. The amount of film-forming agent is dependent on the target minimum filming temperature for the end product and on the minimum filming temperature of the unmodified polymer. In the case of emulsion paints the target minimum filming temperatures are generally below 5° C.

Depending on the intended use of the composition it can be advantageous for it to contain, in emulsion paints, from 0.5 to 15%, preferably from 0.5 to 3%, by mass and, in other paints, from 5 to 30% by mass, preferably from 15 to 30% by mass, based in each case on the dry weight of the polymer (binder).

The composition preferably comprises an isononyl benzoate for which the nonyl alcohols obtained by hydrolyzing the isomeric isononyl benzoates contain less than 10 mol % of 3,5,5-trimethyl hexanol. The benzoic esters and the other esters additionally referred to below can be hydrolyzed in accordance with customary methods by reaction with alkaline media (see, for example, Ullmann's Enzyklopädie der Technischen Chemie, 5th ed., A 10, pp. 254-260).

The preparation of the isononyl benzoate (isomeric nonyl benzoate, INB) present as film-forming agent of the invention in the composition of the invention is described below. The starting product for the preparation of the isononyl benzoate is a mixture of isomeric nonyl alcohols, plus benzoic acid. The mixture of isomeric nonyl alcohols used to prepare the isononyl benzoate is frequently referred to as isononanol. The mixtures (isononanols) used with preference have a high linearity, represented by a 3,5,5-trimethylhexanol content of less than 10 mol % (0-10), preferably less than 5 mol % (0-5), more preferably less than 2 mol % (0-2). The isomer distribution of nonyl alcohol mixtures is determined by the nature of the preparation of the nonyl alcohol (isononanol). The isomer distributions of the nonyl radicals can be determined by the customary measurement methods familiar to the skilled worker, such as NMR spectroscopy, GC or GC/MS. The details given refer to all of the nonyl alcohol mixtures specified below. Nonyl alcohols of this kind (nonyl alcohol mixtures) are available commercially under the CAS numbers 27458-94-2, 68515-81-1, 68527-05-9 or 68526-84-1.

Isononal is prepared by hydroformylating octenes, which in turn are produced in a variety of ways. The raw material used for this purpose generally comprises industrial $C_4$ streams, which initially contain all isomeric $C_4$ olefins in addition to the saturated butanes and, where appropriate, impurities such as $C_3$ and $C_5$ olefins and acetylenic compounds. Oligomerization of this olefin mixture produces predominantly isomeric octene mixtures alongside higher oligomers such as $C_{12}$ and $C_{16}$ olefin mixtures. These octene mixtures are hydroformylated to the corresponding aldehydes and subsequently hydrogenated to the alcohol.

The constitution, i.e., the isomer distribution, of the industrial nonanol mixtures is dependent on the starting material and on the oligomerization and hydroformylation processes. All of these mixtures can be used for preparing the esters of the invention. Preferred nonanol mixtures are those obtained by hydroformylating $C_8$ olefin mixtures, themselves obtained by oligomerizing substantially linear butenes over supported nickel catalysts (e.g., Octol process, Oxeno Olefinchemie GmbH), in the presence of known hydroformylation catalysts, such as Rh (unmodified or with ligands), and/or unmodified cobalt compounds, followed by removal of the catalyst and subsequent hydrogenation of the hydroformylation mixture. The fraction of isobutene in the starting material, based on the total butene content, is less than 5% by weight, preferably less than 3% by weight, more preferably less than 1% by weight. This measure ensures that the fraction of more highly branched nonanol isomers, including that of the 3,5,5-trimethylhexanol, which has proven not very advantageous, is markedly suppressed and is situated within the preferred ranges.

The composition of the invention can, however, also comprise isononyl benzoates obtained by esterifying benzoic acid with a commercially available alcohol mixture, which may contain, for example, the CAS numbers 68551-09-7, 91994-92-2, 68526-83-0, 66455-17-2, 68551-08-6, 85631-14-7 or 97552-90-4. These are alcohol mixtures which in addition to the stated isononyl alcohols also contain alcohols having 7 to 15 carbon atoms (in accordance with the CAS definition). The resultant benzoic acid alkyl ester mixtures therefore include other alkyl esters as well as isononyl benzoates.

The preparation of isononyl benzoate, i.e., the esterification of the benzoic acid with an isomerically pure nonanol or with an isononanol mixture to form the corresponding esters, can be conducted autocatalytically or catalytically, using Brönsted or Lewis acids, for example. Irrespective of what type of catalysis is chosen, a temperature-dependent equilibrium always comes about between the reactants (acid and alcohol) and the products (esters and water). In order to shift the equilibrium in favor of the ester it is possible to use an azeotrope former, with which the water of reaction is removed from the mixture. Since the boiling points of the alcohol mixtures used for the esterification are lower than those of benzoic acid and its esters, and since said alcohol mixtures exhibit a miscibility gap with water, they are frequently used as an azeotrope former, which following removal of the water can be recycled to the process.

The alcohol, or mixture of isomeric alcohols, used to form the ester and serving simultaneously as azeotrope former is therefore employed in excess, preferably with an excess of from 5 to 50%, in particular from 10 to 30%, of the amount needed to form the ester.

As esterification catalysts it is possible to use acids, such as sulfuric acid, methanesulfonic acid or p-toluenesulfonic acid, for example, or metals or their compounds. Tin, titanium, and zirconium are suitable examples, used as finely divided metals or, advantageously, in the form of their salts, oxides or soluble organic compounds. Unlike protic acids, the metal catalysts are high-temperature catalysts, achieving their full activity often only at temperatures above 180° C. They are, however, used with preference on account of the fact that in comparison with proton catalysis they form fewer by-products, such as olefins from the alcohol employed, for example. Exemplary representatives of metal catalysts include tin powder, tin(II) oxide, tin(II) oxalate, titanates such as tetraisopropyl orthotitanate or tetrabutyl orthotitanate, and zirconium esters, such as tetrabutyl zirconate.

The catalyst concentration depends on the nature of the catalyst. In the case of the titanium compounds used with preference it is from 0.005 to 1.0% by mass, based on the reaction mixture, in particular from 0.01 to 0.5% by mass, very preferably from 0.01 to 0.1% by mass.

The reaction temperatures of the esterification amount preferably, when using titanium catalysts, to from 160° C. to 270° C., more preferably from 180° C. to 250° C. The optimum temperatures depend on the reactants, on the progress of the reaction, and on the catalyst concentration. They can easily be determined for any given case by means of experiments. Higher temperatures raise the reaction rates and promote secondary reactions, such as elimination of water from alcohols or the formation of colored by-products, for example. For the removal of the water of reaction it is advantageous that the alcohol is able to distill off from the reaction mixture. The desired temperature or desired temperature range can be set by means of the pressure in the reaction vessel. The reaction is therefore conducted under superatmospheric pressure in the case of low-boiling alcohols and under reduced pressure in the case of higher-boiling alcohols. For example, the reaction of benzoic acid with a mixture of isomeric nonanols is operated in a temperature range of from 170° C. to 250° C. in the pressure range of from 1 bar to 10 mbar.

The volume of liquid to be recycled to the reaction may consist entirely or partly of alcohol obtained by working up the azeotropic distillate. It is also possible to defer the workup and to replace some or all of the volume of liquid removed with fresh alcohol, i.e., an alcohol standing ready in a reservoir vessel.

The crude ester mixtures, which in addition to the ester or esters include alcohol, catalyst or its follow-on products, and also any by-products, are worked up by methods known per se. Workup comprises the following steps: removal of the excess alcohol and any low boilers, neutralization of the acids present, optionally a steam distillation, conversion of the catalyst into a readily filterable residue, separation of the solids, and, if desired, drying. The sequence of these steps may be different in accordance with the workup method employed.

One option is for the nonyl ester or nonyl esters mixture to be separated from the reaction mixture by distillation, where appropriate after neutralization of the mixture.

An alternative is for the nonyl benzoates of the invention to be obtained by transesterifying a benzoic ester with nonanol or with an isononanol mixture. Starting materials used are benzoic esters whose alkyl radicals attached to the oxygen atom of the ester group have 1 to 8 carbon atoms. These radicals can be aliphatic, straight-chain or branched, alicyclic or aromatic. One or more methylene groups in these alkyl radicals may have been replaced by oxygen. It is advantageous that the boiling points of the alcohols on which the starting-material ester is based are lower than those of the nonanol or isononanol mixture used. Preferred starting materials for the transesterification are methyl benzoate, ethyl benzoate, propyl benzoate, isobutyl benzoate, amyl benzoate and/or butyl benzoate.

The transesterification is conducted catalytically, using for example Bronsted or Lewis acids or bases. Irrespective of which catalyst is used a temperature-dependent equilibrium is always established between the reactants (alkyl benzoate and nonanol or isononanol mixture) and the products (nonyl ester or nonyl esters mixture and liberated alcohol). To shift the equilibrium in favor of the nonyl ester or the isononyl esters mixture, the alcohol formed from the starting-material ester is removed from the reaction mixture by distillation.

Here again it is advantageous to use nonanol or the isononanol mixture in excess.

As transesterification catalysts it is possible to use acids, such as sulfuric acid, methanesulfonic acid or p-toluenesulfonic acid, for example, or metals or their compounds. Tin, titanium, and zirconium are suitable examples, used as finely divided metals or, advantageously, in the form of their salts, oxides or soluble organic compounds. Unlike protic acids, the metal catalysts are high-temperature catalysts, achieving their full activity only at temperatures above 180° C. They are, however, used with preference on account of the fact that in comparison with proton catalysis they form fewer by-products, such as olefins from the alcohol employed, for example. Exemplary representatives of metal catalysts include tin powder, tin(II) oxide, tin(II) oxalate, titanates such as tetraisopropyl orthotitanate or tetrabutyl orthotitanate, and zirconium esters, such as tetrabutyl zirconate.

It is additionally possible to use basic catalysts, such as oxides, hydroxides, hydrogen carbonates, carbonates or alkoxides of alkali metals or alkaline earth metals, for example. From this group it is preferred to use alkoxides, such as sodium methoxide, for example. Alkoxides can also be prepared in situ from an alkali metal and a nonanol or an isononanol mixture.

The catalyst concentration depends on the nature of the catalyst. It is normally from 0.005 to 1.0% by mass, based on the reaction mixture.

The reaction temperatures for the transesterification are normally from 100 to 220° C. They must be at least high enough to ensure that at the prevailing pressure, usually atmospheric pressure, the alcohol formed from the starting-material ester is able to distill off from the reaction mixture.

The transesterification mixtures can be worked up in exactly the same way as described for the esterification mixtures.

The composition of the invention may include, as well as isononyl benzoate, further compounds suitable for use as film-forming agents. Thus compositions of the invention may comprise as film-forming agent a mixture of isononyl benzoate and one or more substances from the group consisting of diethylene glycol dibenzoate, dipropylene glycol dibenzoate, triethylene glycol dibenzoate, tripropylene glycol dibenzoate, diethylene glycol monobenzoate, dipropylene glycol monobenzoate, triethylene glycol monobenzoate, tripropylene glycol monobenzoate, n-butyl benzoate, isobutyl benzoate, n-heptyl benzoate, isoheptyl benzoate, n-octyl benzoate, 2-ethylhexyl benzoate, isooctyl benzoate, n-nonyl benzoate, n-decyl benzoate, isodecyl benzoate, 2-propylheptyl benzoate, n-undecyl benzoate, isoundecyl benzoate, n-dodecyl benzoate, isododecyl benzoate, isotridecyl benzoate, n-tridecyl benzoate, $C_{11}$-$C_{14}$-alkyl benzoates ($C_{13}$-rich), dimethyl phthalate, diethyl phthalate, di-n-propyl phthalate, di-n-butyl phthalate, diisobutyl phthalate, di-n-pentyl phthalate, diisopentyl phthalate, diisoheptyl phthalate, diisooctyl phthalate, di-2-ethylhexyl phthalate, diisononyl phthalate, diisodecyl phthalate, di-2-propylheptyl phthalate, di-n-undecyl phthalate, diisoundecyl phthalate, diisotridecyl phthalate, diethylene glycol monomethyl ether, diethylene glycol monoethyl ether, diethylene glycol monopropyl ether, diethylene glycol mono-n-butyl ether, diethylene glycol monoisobutyl ether, diethylene glycol monopentyl ether, triethylene glycol monomethyl ether, triethylene glycol monoethyl ether, triethylene glycol monopropyl ether, triethylene glycol mono-n-butyl ether, triethylene glycol monoisobutyl ether, triethylene glycol monopentyl ether, dipropylene glycol monomethyl ether, dipropylene glycol monoethyl ether, dipropylene glycol monopropyl ether, dipropylene glycol mono-n-butyl ether, dipropylene glycol monoisobutyl ether, dipropylene glycol monopentyl ether, tripropylene glycol monomethyl ether, tripropylene glycol monoethyl ether, tripropylene glycol monopropyl ether, tripropylene glycol mono-n-butyl ether, tripropylene glycol monoisobutyl ether, tripropylene glycol monopentyl ether, 2,2,4-trimethyl-1,3-pentanediol monoisobutyrate, 2,2,4-trimethylpentanediol diisobutyrate, mixtures of diisobutyl esters of dicarboxylic acids, e.g., Lusolvan FBH (BASF AG) or DBE-IB (DuPont), and 2-ethylhexyl 2-ethylhexanoate.

As well as the film-forming agents and polymer binders, compositions of the invention may further comprise fillers, other additives and/or pigments in an amount of preferably from 0.1 to 50% by mass, more preferably from 1 to 25% by mass, and very preferably from 10 to 20% by mass, based on the dry weight of the polymer.

Fillers which may be present in the compositions of the invention include, for example, aluminum hydroxide, calcium carbonate, calcium silicate, cristobalite, dolomite, mica, calcite, kaolin, vitreous silica, kieselguhr, silica, chalk, sodium aluminum silicate, quartz flour, silicon dioxide, heavy spar or talc.

As pigments it is possible in particular for color pigments, such as inorganic pigments, for example ochre, umber, graphite, synthetic white pigments such as titanium white ($TiO_2$), synthetic black pigments such as carbon black, synthetic chromatic pigments such as zinc yellow, zinc green, cadmium red, cobalt blue, ultramarine, manganese violet, red iron oxide, chromium oxide green or strontium yellow, magnetic pigments or organic pigments, such as azo dyes, for example, to be present in the compositions of the invention.

Further additives which may be present in the composition of the invention include in particular, for example, thickeners, dispersants, defoamers or biocides. The thickeners are used to adjust the viscosity of the composition. For this purpose use may be made, for example, of cellulose ethers, acid-functional copolymers, polyurethane thickeners or inorganic systems such as highly disperse silica. It is not uncommon, in order to obtain optimum properties in respect of processing, water retention, water resistance, and storage stability, to use a mixture of two or more different thickeners.

The dispersants serve for better wetting of fillers and pigments. They are needed in particular to enhance the storage stability of compositions of the invention which include fillers or pigments. Examples of dispersants which can be used are compounds based on polyphosphates, polyacrylic acid, and acetophosphonic acid.

The high water content of emulsion paints makes them an ideal nutrient base for molds and bacteria. To counter such infestation use is often made of preservatives. These may be added in the can (in-can preservation) and/or to protect the coating film on the substrate. Typical preservatives here include isothiazolinones and what are called formaldehyde donors.

Emulsion paints in accordance with the present-day state of the art are based predominantly on water. Organic solvents present additionally in the composition generally act only as filming auxiliaries. In the compositions of the invention, therefore, besides water, glycols, for example, but also aliphatics, alcohols, aromatics, esters, glycol ethers, ketones, white spirits, and terpene hydrocarbons, may be present as filming auxiliaries.

Depending on the end application for which the composition of the invention is to be used, i.e., as a varnish, adhesive or emulsion paint, for example, the compositions of the invention may include any of a very wide variety of polymers (binders) customary for these purposes. As film-forming polymers the composition of the invention preferably comprises homopolymers or copolymers, including terpolymers, of esters which in monomer form have at least one double bond, the double bond having been situated either in the carboxylic acid moiety or else in the alcohol moiety of the monomeric ester. With particular preference the composition of the invention comprises polymers obtained by homopolymerization or copolymerization, including terpolymerization, of at least one monomer selected from vinyl esters, acrylates, and methacrylates. Ethylene or styrene, for example, are suitable comonomers.

Examples of polymers of monomers in which the double bond is in the carboxylic acid moiety are those obtained by esterifying ethylenically unsaturated acids, such as acrylic or methacrylic acid, with an alcohol generally having a chain length of 1 to 9, particularly 1 to 4, carbon atoms. The polymers derived therefrom, generally polyacrylates, may optionally include repeating units formed from ethylenically unsaturated compounds such as ethylene or styrene and so are, for example, styrene-acrylate copolymers. Polymerizable esters with the double bond in the alcohol group are, for example, vinyl esters such as vinyl acetate or vinyl butyrate, for example. It is also possible, furthermore, for the polymer binders in the composition of the invention to include polymers obtained by terpolymerization of vinyl chloride with ethylene and vinyl esters. Vinyl acetate homopolymers or else copolymers of vinyl acetate and ethylene are frequently used as binders in aqueous adhesive systems, for example. For emulsion paints it is common to use as binders either terpolymers of vinyl acetate, ethylene, and acrylates or styrene-acrylate copolymers. In some cases even straight acrylates are used.

For the preparation of a paint (emulsion paint) various additives are added to the aqueous dispersion of a film-forming polymer and/or copolymer (which may include terpolymer). Said additives include thickeners, dispersants, film-forming agents, fillers, pigments, defoamers, glycols, biocides, etc.

Compositions of the invention are prepared preferably by a process for producing mixtures of film-forming polymers (binders) with isomeric nonyl benzoates, i.e., of compositions of the invention, said process likewise being provided by this invention. The compositions of the invention are preferably prepared by first processing a dispersion from the film-forming agent or agents together with any thickeners, dispersants, fillers, pigments, defoamers, glycols, biocides, etc. that may be present. This can be done using, for example, a high-speed mill. The suspension prepared in this way is then mixed into the aqueous binder dispersion (latex), preferably using a mixer running at a slow speed.

One or more of the compositions of the invention can be used as a paint (emulsion paint or varnish) or adhesive or for producing paints (emulsion paints or varnishes) or adhesives. End products such as emulsion paints for the interior or exterior sector, varnishes or adhesives are produced in accordance with a method known to the skilled worker.

The examples which follow are intended to illustrate the invention without limiting the scope of application apparent from the description and the claims.

EXAMPLES

Example 1

Synthesis of isononyl benzoate (INB)

A 4 liter distillation flask with top-mounted water separator and reflux condenser and also with a sampling port and thermometer was charged with 976 g of benzoic acid (8 mol), 1728 g of isononanol from Oxeno Olefinchemie GmbH (12 mol) and 0.59 g of butyl titanate (0.06% based on the amount of acid) and this initial charge was heated at boiling under a nitrogen atmosphere. The water of reaction produced during the esterification was taken off at regular intervals. When the acid number fell below 0.1 mg KOH/g (after about 3 hours) the reaction mixture was first cooled to below 60° C. and a 20 cm Multifil column was mounted. Thereafter the pressure was lowered to 2 mbar and first of all the excess alcohol was distilled off (about 120° C.). Following the separation of a middle fraction at up to 140° C., the isononyl benzoate was distilled over in a range from 142 to 147° C. (at 2 mbar), measured at the column head. Gas chromatography indicated a purity of >99.7%.

To determine the boiling point or boiling range the substance was subjected to measurement in a Mettler FP 800 thermosystem in the FP 85 cell, which was connected to the FP 80 central processor. From a starting temperature of 100° C. a temperature ramp of 10° C./min up to 400° C. was run. The DSC curve obtained in this way indicated the boiling range of the isononyl benzoate as being 316 to 326° C.

Example 2

Synthesis of 2-ethylhexyl benzoate

In analogy to the procedure carried out in example 1, 12 mol of 2-ethylhexanol were reacted with 8 mol of benzoic acid and tetrabutyl titanate. Distillation (3 mbar, overhead temperature 134° C.) gives 2-ethylhexyl benzoate in a purity, determined by gas chromatography, of 99.7%.

Example 3

Synthesis of isodecyl benzoate

A 4 liter distillation flask with top-mounted water separator and reflux condenser and also with a sampling port and thermometer was charged with 976 g of benzoic acid (8 mol), 1872 g (12 mol) of isodecanol (Exxal 10, ExxonMobil) and 0.59 g of butyl titanate (0.06% based on the amount of acid) and this initial charge was heated at boiling under a nitrogen atmosphere. The water of reaction produced during the esterification was taken off at regular intervals. When the acid number fell below 0.1 mg KOH/g, after about 3 hours, the excess alcohol was distilled off under reduced pressure through a 10 cm column with Raschig rings. Thereafter the mixture was cooled to 80° C. and transferred to a 4 liter reaction flask with dip tube, top-mounted dropping funnel and column, and attached to a Claisen bridge. It was then neutralized with 5% strength by weight aqueous sodium hydroxide solution (10-fold excess of alkali). The mixture was subsequently heated to 190° C. under reduced pressure (10 mbar). Then 8% by weight of fully demineralized water, based on the amount of crude ester employed, were added dropwise at constant temperature through the dropping funnel. After the water had been added the heating was shut off and cooling took place under reduced pressure. At room temperature, the ester was filtered off on a suction filter with filter paper and filter aid. Gas chromatography indicated a purity for the ester of 99.7%.

Example 4

Determination of Volatility by Means of Thermogravimetric Analysis (TGA)

To obtain information on the volatility of the products the benzoic esters prepared in accordance with examples 1 to 3 were compared in respect of their mass losses at elevated temperatures by means of the dynamic TGA method.

For this purpose 20 mg of a sample were heated in a Pt crucible (lid with hole) in a Netzsch TG 209 thermal balance in a temperature range from 23 to 300° C. with a dynamic temperature increase of 10 K/min and the respective mass loss, in %, was measured.

Table 1 below lists the unevaporated fractions (=100%− mass loss in %):

TABLE 1

| Temperature in ° C. | Example 1 (Isononyl benzoate, inventive) | Example 2 (2-Ethylhexyl benzoate, comparative) | Example 3 (Isodecyl benzoate, comparative) |
| --- | --- | --- | --- |
| 170 | 99.0% | 98.1% | 99.2% |
| 200 | 96.1% | 93.3% | 97.1% |
| 240 | 81.2% | 69.7% | 85.3% |
| 270 | 45.2% | 17.3% | 57.3% |

The temperature at which 50% of the sample has evaporated is 267° C. for isononyl benzoate, 255° C. for 2-ethylhexyl benzoate, and 275° C. for isodecyl benzoate. The relative sequence and the marked differences are in accordance with the expectations that the volatility decreases with increasing molecular weight.

Example 5

Effect of Different Film-Forming Agents on the Minimum Filming Temperature (MFT)

Lipaton AE 4620 (Polymer Latex, Marl), a fine aqueous dispersion of a styrene-acrylate copolymer having a solids fraction of approximately 50%, is mixed with the amounts (% by mass based on the dry matter of the polymer) of film-forming agents stated in the table. After an aging time of one day, the minimum filming temperature (MFT) is determined in accordance with DIN ISO 2115. The final column lists the minimum filming temperatures of the aqueous dispersion without the addition of film-forming agents.

TABLE 2

Determination of the MFT in accordance with DIN ISO 2115

|  | Experiment 1 Isononyl benzoate | Experiment 2 2-Ethylhexyl benzoate | Experiment 3 Isodecyl benzoate | Lipaton AE 4620 Not modified |
|---|---|---|---|---|
| MFT in ° C. for addition of 1% by mass | 9 | 10 | 11 | 18 |
| MFT in ° C. for addition of 3% by mass | 1 | 0 | 2 | 18 |

In both concentrations, the MFT which can be achieved using isononyl benzoate is somewhat lower than that with isodecyl benzoate. Within the bounds of measurement error (±1° C.) the efficiency of 2-ethylhexyl benzoate and isononyl benzoate as film-forming agents is comparable, with advantages on the side of the INB by virtue of the fact that isononyl benzoate achieves a better lowering of the MFT at low concentrations.

Example 6

König Pendulum Damping to Determine the Evaporation Behavior

The dispersions of Lipaton AE 4620 (see table 2, last line) admixed with 3% by mass of film-forming agent are aged under standard conditions for 24 hours before being applied in wet film thicknesses of approximately 200 µm (dry film thickness approximately 85 µm) to glass plates to produce the coatings for testing. The test specimens thus produced are stored for different periods of time and then subjected to the König pendulum damping test (DIN EN ISO 1522). In this test a pendulum lying on the surface of a coating is set to swing and the period of time within which the amplitude of the swing falls until it reaches a set level is measured. The shorter the damping time, the lower the hardness and the higher the amount of film-forming agent. This test provides information on the evaporation behavior of the film-forming agent from the film. The film-forming agent is considered to have evaporated when the hardness of the non-modified film is reached. The results of the test, i.e., the times within which the lo deflection falls, in accordance with the standard, from 6° to 3°, are set out in table 3.

TABLE 3

Results for example 6: Damping period in seconds

|  | Isononyl benzoate | 2-Ethylhexyl benzoate | Isodecyl benzoate | Lipaton AE 4620 not modified |
|---|---|---|---|---|
| After 1 day at room temperature | 4 | 4 | 3 | 39 |
| After 10 days at room temperature | 6 | 7 | 6 | 45 |
| After 6 days at 50° C. | 36 | 38 | 7 | 49 |

Surprisingly it was found that the evaporation behavior of isononyl benzoate and of 2-ethylhexyl benzoate from the corresponding films is virtually identical and is markedly better than that of isodecyl benzoate. Paints or compositions comprising isononyl benzoate and 2-ethylhexyl benzoate as film-forming agents therefore exhibit more rapid through-cure of the paint than those containing isodecyl benzoate. This is especially surprising in view of the fact that the volatilities of these benzoates, as determined by thermogravimetric analysis in example 4, would have suggested a distinct difference between 2-ethylhexyl benzoate and isononyl benzoate. As a result of this deviation from the expected correlation it is possible to cure compositions of the invention more rapidly despite the boiling point being higher than that of 2-ethylhexyl benzoate. As evident from example 5, however, the effect of isononyl benzoate on the minimum filming temperature of a composition is comparable with that of 2-ethylhexyl benzoate.

Example 7

Alternative Synthesis of Isononyl Benzoate (JNB)

A 4 liter distillation flask with top-mounted water separator and reflux condenser and also with a sampling port and thermometer was charged with 976 g of benzoic acid (8 mol), 1728 g of isononanol from Oxeno Olefinchemie GmbH (12 mol) and 0.59 g of butyl titanate (0.06% by weight based on the amount of acid) and this initial charge was heated at boiling under a nitrogen atmosphere. The water of reaction produced during the esterification was taken off at regular intervals. When the acid number fell below 0.1 mg KOH/g (after about 3 hours) the mixture was first cooled to below 60° C. and a 20 cm packed column was mounted. Thereafter the pressure was reduced to 2 mbar and first of all the excess alcohol was removed by distillation (temperature at the top of the column about 120° C.). Thereafter the batch was cooled to 80° C. and transferred to a 4 liter reaction flask with dip tube, top-mounted dropping funnel and column, and attached to a Claisen bridge. It was then neutralized with 5% strength by weight aqueous sodium hydroxide solution (5-fold excess of alkali) and stirred for 30 minutes more. Subsequently it was heated to 190° C. under reduced pressure (about 10 mbar). Then 8% by weight of fully demineralized water, based on the amount of crude ester employed, was added dropwise at constant temperature through the dropping funnel. Care was taken during this procedure to ensure that the overhead temperature did not climb above 120° C. Following the addition of water the heating was shut off and the mixture was cooled under reduced pressure. The ester was filtered off at room temperature on a suction filter with filter paper and filter aid. Gas chromatography indicated a purity for the ester of 99.7%.

What is claimed is:

1. A composition, comprising:
   an aqueous dispersion of at least one film-forming polymer selected from the group consisting of homopolymers and copolymers; and
   at least one film-forming agent;
   wherein:
   the at least one film-forming agent comprises isononyl benzoate;
   the isononyl benzoate is present in an amount of from 0.1 to 30% by mass, based on a dry weight of the polymer; and
   the isononyl benzoate is an isononyl benzoate for which nonyl alcohols obtained by hydrolyzing isomeric isononyl benzoates contain less than 10 mol % of 3,5,5-trimethylhexanol.

2. The composition as claimed in claim 1, wherein the at least one film-forming agent comprises a mixture of isononyl benzoate and at least one member selected from the group consisting of diethylene glycol dibenzoate, dipropylene glycol dibenzoate, triethylene glycol dibenzoate, tripropylene glycol dibenzoate, diethylene glycol monobenzoate, dipropylene glycol monobenzoate, triethylene glycol monobenzoate, tripropylene glycol monobenzoate, n-butyl benzoate, isobutyl benzoate, n-heptyl benzoate, isoheptyl benzoate, n octyl benzoate, 2-ethylhexyl benzoate, isooctyl benzoate, n-nonyl benzoate, n-decyl benzoate, isodecyl benzoate, 2-propylheptyl benzoate, n-undecyl benzoate, isoundecyl benzoate, n dodecyl benzoate, isododecyl benzoate, isotridecyl benzoate, n- tridecyl benzoate, $C_{13}$-rich $C_{11}$-$C_{14}$-alkyl benzoates, dimethyl phthalate, diethyl phthalate, di-n-propyl phthalate, di-n-butyl phthalate, diisobutyl phthalate, di-n-pentyl phthalate, diisopentyl phthalate, diisoheptyl phthalate, diisooctyl phthalate, di-2-ethylhexyl phthalate, diisononyl phthalate, diisodecyl phthalate, di-2-propylheptyl phthalate, di-n-undecyl phthalate, diisoundecyl phthalate, diisotridecyl phthalate, diethylene glycol monomethyl ether, diethylene glycol monoethyl ether, diethylene glycol monopropyl ether, diethylene glycol mono-n-butyl ether, diethylene glycol monoisobutyl ether, diethylene glycol monopentyl ether, triethylene glycol monomethyl ether, triethylene glycol monoethyl ether, triethylene glycol monopropyl ether, triethylene glycol mono-n-butyl ether, triethylene glycol monoisobutyl ether, triethylene glycol monopentyl ether, dipropylene glycol monomethyl ether, dipropylene glycol monoethyl ether, dipropylene glycol monopropyl ether, dipropylene glycol mono-n-butyl ether, dipropylene glycol monoisobutyl ether, dipropylene glycol monopentyl ether, tripropylene glycol monomethyl ether, tripropylene glycol monoethyl ether, tripropylene glycol monopropyl ether, tripropylene glycol mono-n-butyl ether, tripropylene glycol monoisobutyl ether, tripropylene glycol monopentyl ether, 2,2,4-trimethyl-1,3-pentanediol monoisobutyrate, 2,2,4-trimethylpentanediol diisobutyrate, mixtures of diisobutyl esters of $C_4$-$C_6$ dicarboxylic acids, and 2-ethylhexyl 2-ethylhexanoate.

3. The composition as claimed in claim 1, further comprising at least one additional component selected from the group consisting of fillers, additives and pigments;
   wherein the at least one additional component is present in an amount of from 0.1 to 50% by mass, based on the dry weight of the polymer.

4. The composition as claimed in claim 1, comprising a filming auxiliary.

5. The composition as claimed in claim 1, wherein the at least one film-forming polymer comprises homopolymers or copolymers of unsaturated esters.

6. The composition as claimed in claim 5, wherein the at least one film-forming polymer comprises polymers obtained by homopolymerization or copolymerization of at least one monomer selected from the group consisting of vinyl esters, acrylates, and methacrylates.

7. The composition as claimed in claim 1, wherein the at least one film-forming polymer comprises at least one terpolymer.

8. A method of painting, comprising applying the composition of claim 1 to a substrate.

9. A method of applying adhesive, comprising applying the composition of claim 1 to a substrate.

10. A method of preparing a paint, comprising utilizing the composition of claim 1.

11. A method of preparing an adhesive, comprising utilizing the composition of claim 1.

12. A method of forming an adhesive or paint composition, comprising utilizing isononyl benzoate as a film-forming agent, wherein the isonynyl benzoate is an isononyl benzoate for which nonyl alcohols obtained by hydrolyzing isomeric isononyl benzoates contain less than 10 mol % of 3,5,5-trimethylhexanol.

* * * * *